(12) United States Patent
Lee

(10) Patent No.: US 10,345,975 B2
(45) Date of Patent: Jul. 9, 2019

(54) TOUCH SCREEN PANEL

(71) Applicant: Samsung Display Co., Ltd., Yongin-si, Gyeonggi-do (KR)

(72) Inventor: Seung-Jin Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 8 days.

(21) Appl. No.: 15/338,822

(22) Filed: Oct. 31, 2016

(65) Prior Publication Data

US 2017/0045971 A1 Feb. 16, 2017

Related U.S. Application Data

(63) Continuation of application No. 14/021,154, filed on Sep. 9, 2013, now abandoned.

(30) Foreign Application Priority Data

Mar. 20, 2013 (KR) .................. 10-2013-0029832

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/041* (2013.01); *G06F 2203/04111* (2013.01)

(58) Field of Classification Search
CPC ... G02F 2001/133388; G02F 1/136286; G02F 1/133512; G02F 1/134363
See application file for complete search history.

(56) References Cited

U.S. PATENT DOCUMENTS

2003/0132920 A1 7/2003 Lee et al.
2008/0007534 A1* 1/2008 Peng .................. G06F 3/044
  345/173

(Continued)

FOREIGN PATENT DOCUMENTS

CN   101699379   4/2010
CN   101983397   3/2011

(Continued)

OTHER PUBLICATIONS

First Office Action dated Oct. 30, 2017, issued in Chinese Patent Application No. 201310545142.1.

(Continued)

*Primary Examiner* — Nan-Ying Yang
(74) *Attorney, Agent, or Firm* — H.C. Park & Associates, PLC

(57) ABSTRACT

A touch screen panel that includes a substrate comprising an active area and a non-active area positioned outside the active area, first and second sensing electrodes formed over the active area, wherein the first sensing electrodes connected along a first direction, and wherein the second sensing electrodes connected along a second direction that intersects the first direction, and outside wiring lines formed in the non-active area to connect the first and second sensing electrodes to an external driving circuit in units of lines and having at least one of slits that cross insides of the outside wiring lines so that widths of conductive paths are reduced in partial sections.

13 Claims, 3 Drawing Sheets

(56) References Cited

U.S. PATENT DOCUMENTS

| | | | |
|---|---|---|---|
| 2008/0106412 A1* | 5/2008 | Sakama | G06K 19/07749 340/572.1 |
| 2008/0203577 A1* | 8/2008 | Fukamizu | H01L 24/05 257/773 |
| 2009/0303189 A1 | 12/2009 | Grunthaner et al. | |
| 2010/0177270 A1* | 7/2010 | Nakagawa | G02F 1/136259 349/141 |
| 2010/0231544 A1 | 9/2010 | Lu et al. | |
| 2011/0109611 A1* | 5/2011 | Nakamura | G09G 3/20 345/211 |
| 2012/0169665 A1 | 7/2012 | Misaki | |
| 2012/0188201 A1* | 7/2012 | Binstead | G06F 3/041 345/174 |

FOREIGN PATENT DOCUMENTS

| | | |
|---|---|---|
| CN | 102057349 | 5/2011 |
| JP | 2008-083899 | 4/2008 |
| KR | 10-2002-0051350 | 6/2002 |
| KR | 10-2011-0059567 | 6/2011 |
| KR | 10-2011-0060338 | 6/2011 |
| KR | 10-2012-0120006 | 11/2012 |
| WO | 2011/0033907 | 3/2011 |

OTHER PUBLICATIONS

Notice of Allowance dated May 21, 2019, issued in the Korean Patent Application No. 10-2013-0029832.

* cited by examiner

TOUCH SCREEN PANEL

CLAIM OF PRIORITY

This application makes reference to, incorporates the same herein, and claims all benefits accruing under 35 U.S.C. § 120 from, and is a Continuation of an application for TOUCH SCREEN PANEL, earlier filed in the United States Patent and Trademark Office on 9 Sep. 2013 and their duly assigned Ser. No. 14/021,154, which claims priority under 35 § 119 from an application earlier filed in the Korean Intellectual Property Office on 20 Mar. 2013 and there duly assigned Serial No. 10-2013-0029832.

BACKGROUND OF THE INVENTION

1. Field of the Invention

An aspect of the present invention generally relates to a touch screen panel.

2. Description of the Related Art

A touch screen panel is an input device capable of selecting the indication content displayed on the screen of an image display device by a human hand or an object to input the command of a user.

The touch screen panel is provided on the front face of the image display device to convert a contact position of the human hand or the object into an electrical signal. Therefore, the indication content selected in the contact position is received as an input signal.

The above information disclosed in this Related Art section is only for enhancement of understanding of the background of the invention and therefore it may contain information that does not form the prior art that is already known to a person of ordinary skill in the art.

SUMMARY OF THE INVENTION

The other aspects of the present invention, there is provided a touch screen panel, comprising a substrate comprising an active area and a non-active area positioned outside the active area, first and second sensing electrodes formed over the active area, wherein the first electrodes connected along a first direction, and the second sensing electrodes connected along a second direction that intersects the first direction, and outside wiring lines formed in the non-active area to connect the first and second sensing electrodes to an external driving circuit in units of lines and having at least one of slits that cross insides of the outside wiring lines so that widths of conductive paths are reduced in partial sections.

The slit may include a first slit extended in a direction that intersects a longitudinal direction of the outside wiring lines and a second slit extended to parallel in the longitudinal direction of the outside wiring lines.

The slit may be L or T shaped.

The slit may include a plurality of slits formed over one outside wiring line.

The outside wiring lines may have different lengths and the number of slits may be increased as the lengths of the wiring lines are smaller.

The outside wiring lines may have different lengths and a length of the second slit may be increased as the lengths of the wiring lines are smaller.

The outside wiring lines may include strip patterns divided by the slit.

The strip patterns may be extended to parallel in a longitudinal direction of the outside wiring lines.

The outside wiring lines may have substantially a uniform width in all sections.

The outside wiring lines may be a low resistance metal material

The outside wiring lines may include at least one selected from consisting; of Mo, Ag, Ti, Cu, Al, and Mo/Al/Mo.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

Figure 1:
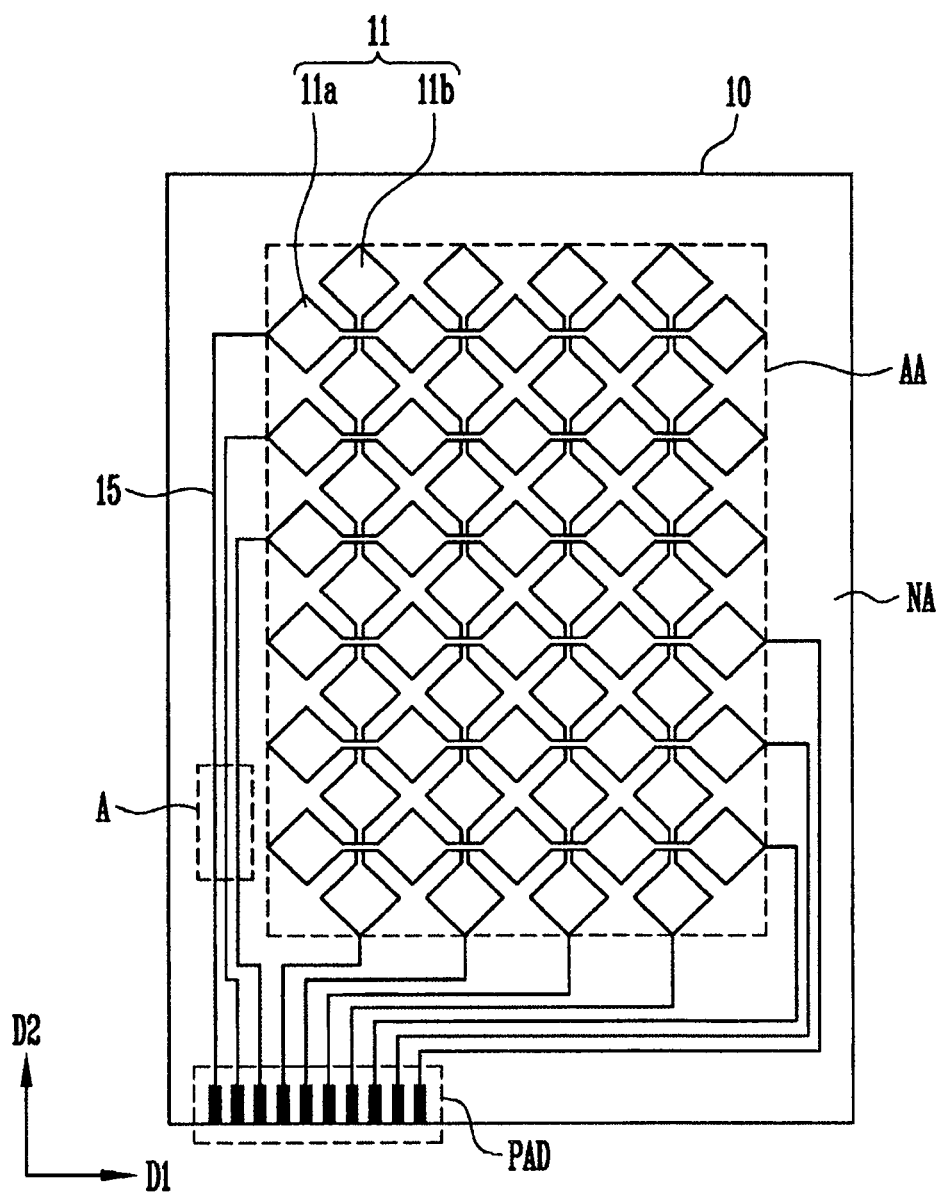
Figure 3A:
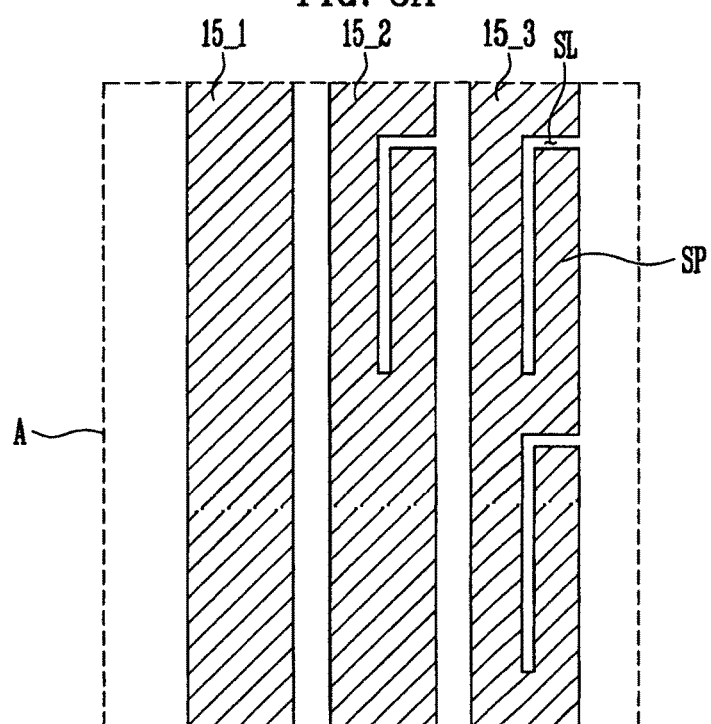

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 is a plan view schematically illustrating a touch screen panel according to an embodiment of the present invention;

FIGS. 2A to 2D are partial magnifying views illustrating embodiments of slits formed over outside wiring lines;

FIG. 3A is a partial magnifying view of a region A of FIG. 1; and

Figure 3B:
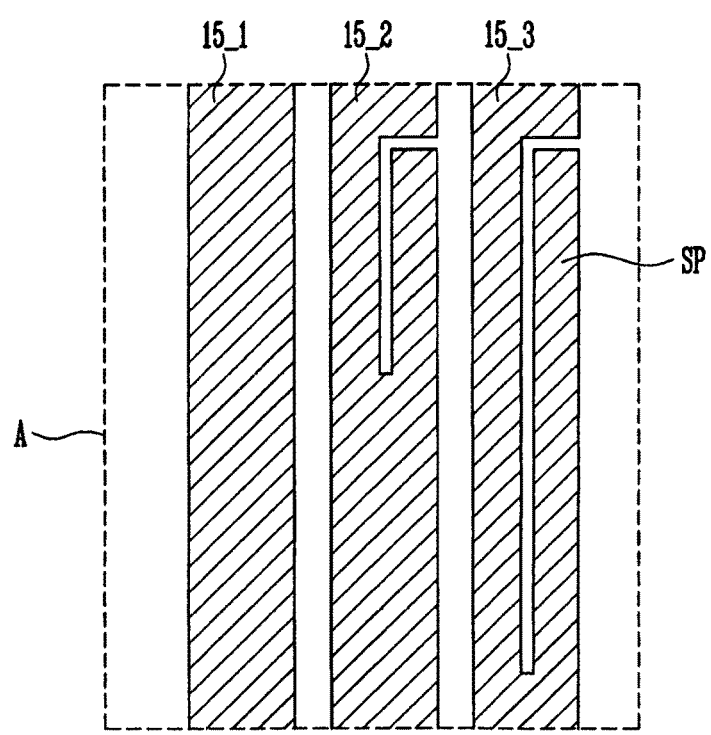

FIG. 3B is a partial magnifying view of a region A according to another embodiment of the present invention.

DETAILED DESCRIPTION OF THE INVENTION

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" of "coupled to" another element or layer, it can be directly on, connected of coupled to the other element or layer or intervening elements or layers may be present. In contrast, when an element is referred to as being "directly on," "directly connected to" or "directly coupled to" another element or layer, there are no intervening elements or layers present Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of Manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted s having a meaning that is consistent with their meaning in the context of the relevant art and will not be interpreted in an idealized or overly formal sense unless expressly so defined herein.

In general, in a touch screen panel, sensing electrodes are formed in a display area where an image is displayed so that a touch event generated in the display area is recognized as an input signal.

In addition, outside wiring lines connected to the sensing electrodes in units of lines and a pad unit for connecting the sensing electrodes to an external driving circuit are formed in a non-display area formed outside the display area.

In the conventional touch screen panel, due to a difference between lengths of the outside wiring lines, resistance values of the outside wiring lines vary. In addition, due to a difference between areas of the outside wiring lines proportional to the difference between the lengths of the outside wiring lines, capacitance values of the outside wiring lines vary.

For example, since lengths of outside, wiring lines connected to sensing electrodes adjacent to the pad unit are small, resistance values and capacitance values are relatively small and, since lengths of outside wiring lines connected to sensing electrodes remote from the pad unit are large, resistance values and capacitance values are relatively large.

Such a difference between electrical characteristics of the outside wiring lines may distort a signal for sensing a touch event to prevent the touch event from being correctly detected.

FIG. 1 is a plan view schematically illustrating a touch screen panel according to an embodiment of the present invention.

Referring to FIG. 1, a touch screen panel may include a substrate 10 divided into an active area AA and a non-active area NA, sensing electrodes 11 formed over the active area AA of the substrate 10, outside wiring lines 15 formed over the non-active area NA, and a pad unit PAD for connecting the sensing electrodes to an external driving circuit.

The substrate 10 may be divided into the touch active area AA that overlaps an image display area and in which the sensing electrodes 11 for sensing a touch input are formed and a non-active area NA that is positioned on the outside of the active area AA and in which the outside wiring lines 15 are formed.

The substrate 10 may be formed of a transparent material having high thermal and chemical resistance and may be a thin film substrate formed of at least one selected from the group consisting of, for example, polyethylene terephthalate (PET), polycarbonate (PC), acryl, polymethylmethacrylate (PMMA), triacetyl cellulose (TAC), polyethersulfone (PES), and polyimide (PI).

The sensing electrodes 11 may include first sensing electrodes 11a and second sensing electrodes 11b arranged to be dispersed in the active area AA on the substrate 10 and are electrically connected to each other in different directions.

To be specific, the first sensing electrodes 11a may be formed to be connected to each other in a first direction D1 and the second sensing electrodes 11b may be formed to be arranged between the first sensing electrodes 11a and to be connected to each other in a second direction D2 that intersects the first direction D1.

That is, the first sensing electrodes 11a and the second sensing electrodes 11b are alternately arranged to be connected in different directions. For example, the first sensing electrodes Ha may be formed to be connected in a row direction (a horizontal direction) and may be connected to the outside wiring lines 15, respectively, in units of row lines and the second sensing electrodes Ha may be formed to be connected in a column direction (a vertical direction) and may be connected to the outside wiring lines 15, respectively, in units of column lines.

The sensing electrodes 11 may be formed of a transparent electrode material such as indium tin oxide (ITO) to transmit light and may be formed by depositing the conductive material on the substrate 10 and patterning the deposited conductive material by a photo lithography method.

Touch sensing methods may include an electro-capacitive method, a resistance layer method, a surface acoustic wave method, and an infrared method. Among the above methods, the mainly used electro-capacitive touch screen panel senses a change in capacitance formed by a conductive sensing electrode with another peripheral sensing electrode or a ground electrode when the human hand or the object contacts the touch screen panel to convert a contact position into an electrical signal.

In the present embodiment, the first and second sensing electrodes 11a and 11b are formed of the same material and may be arranged on one surface of the substrate 10 in the same layer in a diamond pattern.

However, a material, a shape, and an arrangement structure of the sensing electrodes 11 may have various modifications and the present invention is not limited to the above.

For example, the first and second sensing electrodes 11a and 11b may be arranged in different layers in a linear stripe pattern. In another embodiment, the sensing electrodes 11 may be formed over a metal mesh pattern realized not by a transparent conductive material but by minute metal lines. In still another embodiment, the first and second sensing electrodes 11a and 11b may be formed on both surfaces of the substrate 10 with the substrate 10 interposed.

On the other hand, the outside wiring lines 15 for connecting the first sensing electrodes 11a and the second sensing electrodes 11b to the external driving circuit in units of lines in the first and second directions D1 and D2 are electrically connected to the first and second sensing electrodes 11a and 11b in units of row and column lines, respectively, to connect the first and second sensing electrodes 11a and 11b to the external driving circuit such as a position detecting circuit (not shown) through the pad unit PAD.

The outside wiring lines 15 are arranged in the non-active area NA outside the touch screen panel to avoid the active area AA in which the image is displayed and may be extended from the sensing electrodes 11 to the pad unit PAD in the second direction D2 that is a long side direction of the touch screen panel.

As illustrated in the drawing, lengths of the outside wiring lines 15 extended from the sensing electrodes 1 to the pad unit PAD vary. For example, lengths of outside wiring lines connected to sensing electrodes 11 at a lower end adjacent to the pad unit PAD are relatively small and lengths of outside wiring lines connected to sensing electrodes 11 at an upper end remote from the pad unit PAD are relatively large.

Since the outside wiring lines 15 are formed over the non-active area NA, the outside wiring lines 15 may be formed of a low resistance metal material such as Mo, Ag, Ti, Cu, Al, and Mo/Al/Mo other than a transparent electrode material used for forming the sensing electrodes 11.

Figure 2A:
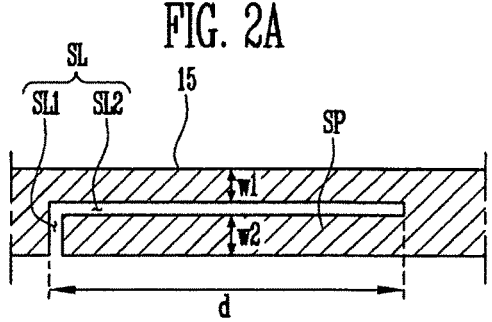
Figure 2B:
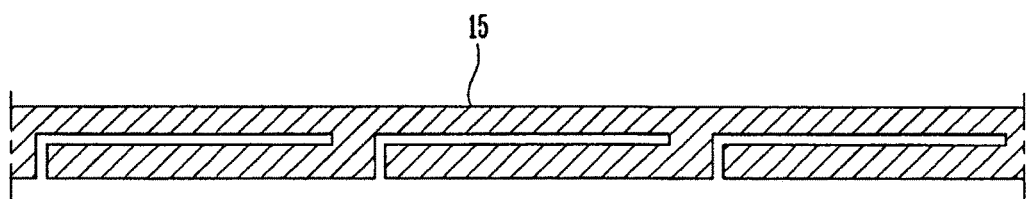
Figure 2C:
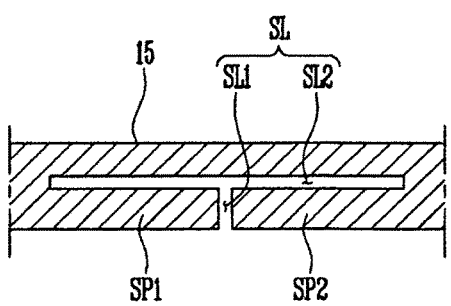
Figure 2D:
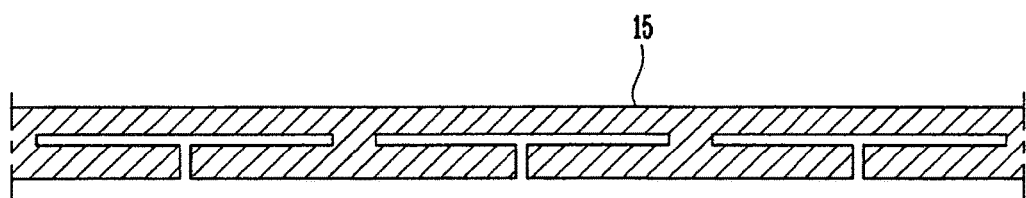

FIGS. 2A and 2B are partial magnifying views illustrating embodiments of slits formed over outside wiring lines.

Referring to FIGS. 2A to 2D, in the outside wiring lines 15, slits SL that cross insides of the outside wiring lines 15 so that widths of conductive paths are reduced are formed over partial sections of the outside wiring lines 15. In addition, the outside wiring lines 15 include strip patterns SP divided by the slits SL.

To be specific, the slits St from which the conductive material of which the outside wiring lines 15 is removed divide the partial sections of the outside wiring lines into the conductive paths through which current flows and pans from which the conductive material is not removed but through which current does not flow, that is, the strip patterns SP.

Each of the slits SL may include a first slit SL1 extended in a direction that intersects a longitudinal direction of the outside wiring lines 15 and a second slit SL2 extended to run parallel in the longitudinal direction of the outside wiring, lines 15.

The plurality of slits SL may be formed over one outside wiring line. Slits SL of different shapes and sizes may mixedly exist in one outside wiring line.

One end of the strip pattern SP is electrically floated. That is, the strip pattern SP as a part of the outside wiring lines 15 is formed of a conductive material. However, since extended one end of the strip pattern SP is opened by a first slit SL1, current does not directly flow through the strip pattern SP.

The strip pattern SP does not form the conductive path but functions as a capacitor that collects charges. Although the width of the conductive path is reduced by the slits SL so that the resistance values of the outside wiring lines are increased, the capacitance values of the outside wiring lines are not reduced.

The entire widths of the outside wiring lines 15 may not be changed but may be uniformly maintained. In addition, the width of the slit SL may be a minimum width allowed by a process.

For example, when a first width w1 of the conductive path formed by the slit SL is reduced, a second width w2 of the strip pattern SP is increased and, when the First width w1 is increased, the second width w2 is reduced. That is, the sum of the first width w1 and the second width w2 is uniform and must be the same as a width of a section in which the slits SL are not formed. In another embodiment, the first slit SL1 and the second slit SL2 may be formed to be inclined against the longitudinal direction of the wiring line.

The slit SL and the strip pattern SP may be patterned in a process of forming the outside wiring lines 15 on the substrate 10.

The slit SL may be L or T shaped to be entirely bent. However, various modifications may be provided in accordance with a design condition. The outside wiring lines 15 having the shaped slits SL may have first strip patterns SP1 and second strip patterns SP2 that face each other.

FIG. 3A is a partial magnifying view of a region A of FIG. 1 and FIG. 3B is a partial magnifying view of a region A according to another embodiment of the present invention.

As described above, since the lengths of the outside wiring lines 15 vary, the conventional touch screen panel has different resistance and capacitance values due to a difference between the lengths of the outside wiring lines 15.

Therefore, according to the present invention, the slits SL that cross the insides of the outside wiring lines 15 so that the widths of the conductive paths are reduced are formed over the partial sections of the outside wiring lines 15 to control electrical characteristic values.

In particular, the slits SL are formed over the outside wiring lines having relatively small lengths among the outside wiring lines 15 and the strip patterns SP are formed by the slits SL in other areas than the conductive paths so that only the resistance values of the outside wiring lines 15 may be increased with the capacitance values of the outside wiring lines 15 maintained. A length and width of the strip pattern SP may be controlled so that the resistance values or RC delay values of the outside wiring lines 15 are equal to each other.

Retelling to FIGS. 3A and 3B, the outside wiring lines 15 have different lengths. As the lengths of the outside wiring lines are smaller, the number of slits SL may be increased or lengths of the second slits SL2 may be increased.

For example, when the lengths of the wiring lines are in the order of a length of a first outside wiring line 15_1, a length of a second outside wiring line 15_2, and a third outside wiring line 15_3, the slits SL are formed so that resistance values of RC delay values of the second outside wiring line 15_2 and the third outside wiring line 15_3 are equal to a resistance value or an RC delay value of the first outside wiring line 15_1.

In order to equalize the resistance values or the RC delay values of the outside wiring lines 15, since an increase in the resistance value of the third outside wiring line 15_3 having a smaller length than that of the second outside wiring line 15_2 must be larger, the number of slits SL in the third outside wiring line 15_3 may be larger or the length of the second slit SL2 extended to run parallel with the reduced conductive path may be increased.

Hereinafter, a theoretical model in which the resistance values or the RC delay values of the outside wiring lines 15 are made equal to each other by the slits SL will be described.

The resistance values of the outside wiring lines 15 are proportional to the lengths of the outside wiring lines and are inversely proportional to the widths of the wiring lines. Since the conductive path is reduced to have the first width w1 in the section where the slits SL are formed, the entire resistance value of the wiring line in which the slits SL are formed may be increased. The reduced conductive path may be extended, that is, a length d of the second slit SL2 may be controlled so that a degree of increase in the resistance value may be controlled.

On the other hand, the capacitance values of the outside wiring lines 15 are proportional to the area of the outside wiring lines 15. That is, the capacitance values are increased in proportion to the lengths and widths of the outside wiring lines 15 and the strip patterns SP in the section where the slits SL are formed as pans of the outside wiring lines 15 have predetermined capacitance values proportional to the second width w2 and the length (of the strip pattern SP.

In the section where the slits SL, are formed, the conductive path is reduced to have the first width w1. However, since the strip patterns SP divided from the conductive path exist in the remaining areas, an amount of reduction M the entire area of the wiring lines is only the areas removed by the slits SL.

Since the slits SL are formed to have the minimum width allowed in a process, a change in the capacitance values caused by the slits SL are ignorable.

As a result, in a state where the capacitance values of the outside wiring lines 15 in which the slits SL are formed are not remarkably changed in comparison with a case in which the slits SL are not formed, only the resistance values may be changed by the size of the strip patterns SP.

In general, deviation in the RC delay values of the outside wiring lines 15 calculated by multiplying the resistance values of the wiring lines and the capacitance values is large in the outside wiring lines 15 having different lengths.

For example, since the resistance values and the capacitance values are proportional to the lengths of the wiring lines, the resistance values and the capacitance values of the outside wiring lines having large lengths are different from those of the outside wiring lines having small lengths. Since the RC delay values are calculated by multiplying the resistance values and the capacitance values, deviation in the RC delay values of the outside wiring lines 15 is further increased. A difference between the RC delay value of the outside wiring line having the largest length and that of the outside wiring line having the smallest length is up to six times.

According to the present invention, when the slits SL are formed over the outside wiring lines 15, a change in the capacitance values is ignorable. However, the resistance values are increased by the section in which the slits SL are formed.

At this time, in order to obtained a desired target resistance value, the length of the slits SL or the number of slits SL may be controlled so that the resistance values may be controlled. Here, the target resistance value may be the resistance value of the outside wiring line having the largest length and may be the resistance values of the outside wiring lines 15 for equalizing the RC delay values considering the different capacitance values of the outside wiring lines 15.

When the resistance values of the outside wiring lines 15 are equalized by the slits SL, deviation in the RC delay values of the outside wiring lines 15 is generated by a difference in the capacitance values. However, when the target resistance value is corrected by the difference in the capacitance values so that the slits SL are formed over the outside wiring lines 15, all of the outside wiring lines 15 may have the same RC delay value.

Set up of the target resistance value and the length of the slits SL in accordance with the target resistance value or the number of slits SL may vary with the design condition.

As described above, according to the embodiments of present invention, the slits that cross the insides of the outside wiring lines so that the widths of the conductive paths are reduced may be formed over the partial sections of the outside wiring lines to control the electrical characteristic values of the outside wiring lines.

And the slits are formed over the outside wiring lines having smaller lengths among the outside wiring lines and the strip patterns are formed by the slits in the other areas than the conductive path so that only the resistance values may be increased with the capacitance values of the outside wiring lines maintained. The length and width of the strip patterns are controlled so that the resistance values or the RC delay values of the outside wiring lines are equal to each other.

Accordingly, embodiments of the present invention has been made to provide a touch screen panel capable of equalizing electrical characteristics of outside wiring lines.

The electrical characteristic, values of the outside wiring lines may be equalized so that a touch function may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel, comprising:
a substrate comprising an active area and a non-active area positioned outside the active area;
first and second sensing electrodes formed on the active area, wherein the first sensing electrodes are connected along a first direction, and wherein the second sensing electrodes are connected along a second direction that intersects the first direction;
outside wiring lines formed in the non-active area to connect the first and second sensing electrodes to an external driving circuit; and
a first slit formed in one of the outside wiring lines closer to the active area having a greater area than a second slit formed in another one of the outside wiring lines disposed away from the active area, wherein:
each slit formed in an outside wiring line comprises a first slit portion extended in a direction that intersects a longitudinal direction of the outside wiring line and opens to an outside edge of the outside wiring line, and a second slit portion extended from the first slit portion in parallel with the longitudinal direction of the outside wiring line;
the outside wiring line comprises a strip pattern surrounded by the first slit portion, the second slit portion, and the outside edge of the outside wiring line; and
each slit formed in the outside wiring line divides each outside wiring lines into a portion through which current flows, and the strip pattern formed of a conductive material and not flowing the current.

2. The touch screen panel as claimed in claim 1, wherein the outside wiring line closer to the active area has a length shorter than a length of the outside wiring line disposed away from the active area.

3. The touch screen panel as claimed in claim 1, wherein the first slit portion of each slit crosses the outside wiring line so that widths of conductive paths are reduced in partial sections.

4. The touch screen panel as claimed in claim 1, wherein the first sensing electrodes and the second electrodes are alternately arranged so as not to overlap with each other.

5. The touch screen panel as claimed in claim 1,
wherein the outside wiring lines have different lengths, and
wherein the number of slits is increased as lengths of the outside wiring lines are smaller.

6. The touch screen panel as claimed in claim 1,
wherein the outside wiring lines have different lengths, and
wherein a length of the second slit portion is increased as lengths of the outside wiring lines are smaller.

7. The touch screen panel as claimed in claim 1, wherein the strip pattern is extended to parallel in the longitudinal direction of the outside wiring lines.

8. The touch screen panel as claimed in claim 7, wherein the strip pattern formed in the outside wiring line closer to the active area has a greater area than the strip pattern formed in the outside wiring line away from the active area.

9. The touch screen panel as claimed in claim 1, wherein the outside wiring lines have substantially a uniform width in all sections.

10. The touch screen panel as claimed in claim 1, wherein the outside wiring lines include a low resistance metal material.

11. The touch screen panel as claimed in claim 10, wherein the low resistance metal material includes at least one selected from the group consisting of Mo, Ag, Ti, Cu, Al, and Mo/Al/Mo.

12. The touch screen panel as claimed in claim 1,
wherein the outside wiring lines comprise a first outside wiring line and a second outside wiring line positioned closer to the active area than the first outside wiring line, and
wherein the slit formed in the second outside wiring line has a greater length than the slit formed in the first outside wiring line.

13. The touch screen panel as claimed in claim 1,
wherein the outside wiring lines comprise a first outside wiring line and a second outside wiring line positioned closer to the active area than the first outside wiring line, and
wherein the number of slits formed in the second outside wiring line is greater than the number of slits formed in the first outside wiring line.

* * * * *